UNITED STATES PATENT OFFICE.

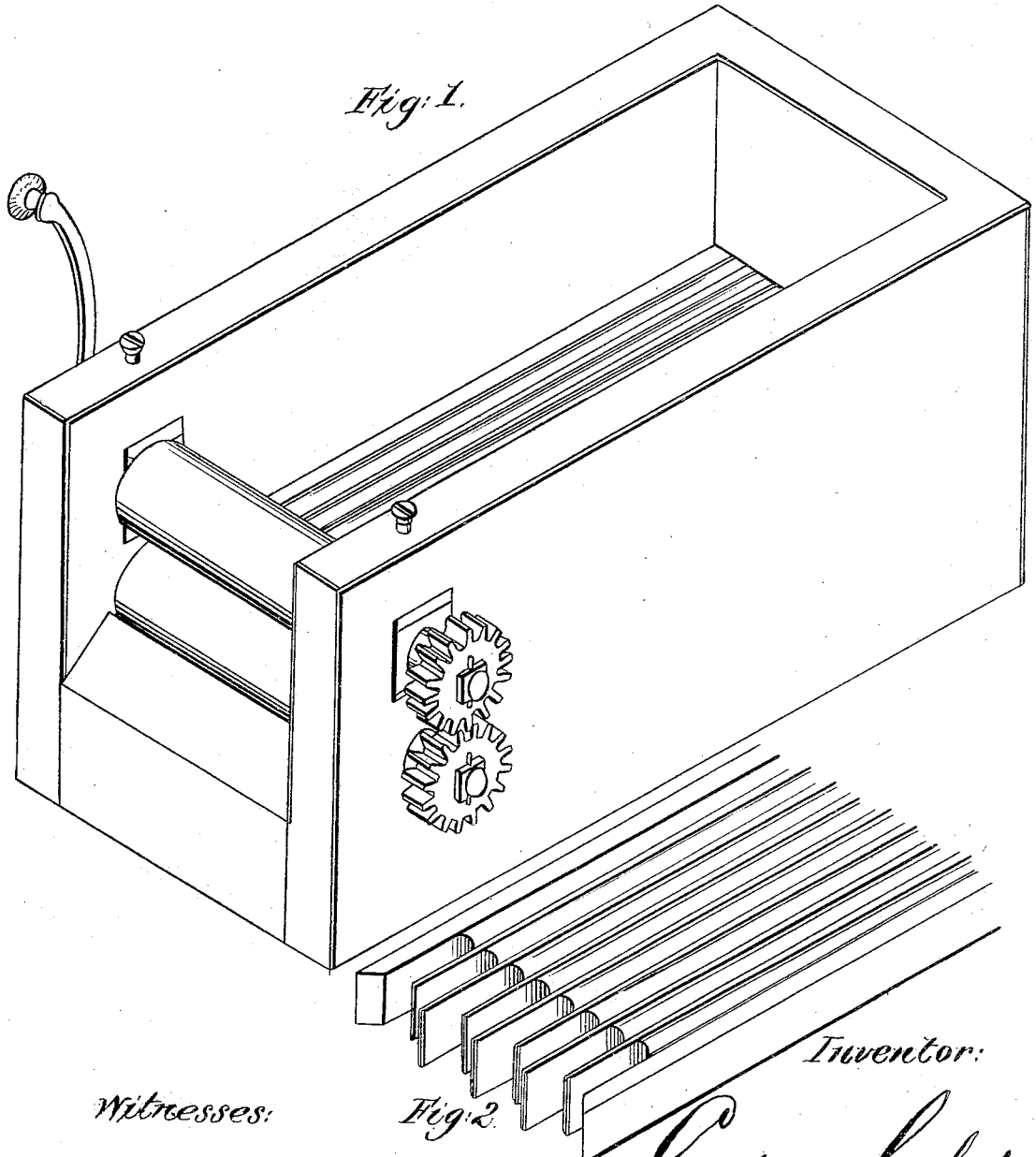

GELSTON SANFORD, OF NEW YORK, N. Y.

PEA-SHELLER AND CHERRY-STONER.

Specification forming part of Letters Patent No. 50,278, dated October 3, 1865.

*To all whom it may concern:*

Be it known that I, GELSTON SANFORD, of New York city, have invented a new and useful Machine for Shelling Green Pease, Pitting Cherries, &c.; and I do hereby declare that the following is a full and exact description thereof, reference being had to the accompanying drawings, and to the letters of reference thereon marked.

Figure 1 is a view in perspective. Fig. 2 is a detached view, showing the feed-board.

The nature of my invention consists in using two rollers geared together, and having a bite or interval between them equal to the thickness of the hull of the pea or the pulp of the fruit, but insufficient for the passage of the pease or pits. These rollers A A are plain, wooden rollers, or they may be covered, or may be longitudinally rigid; but I find from experience that the plain wooden rollers shown in the drawings are perfectly effective. The rollers are arranged with springs *a* and set-screws *s*, so as to regulate the bite according to the thickness of the pea-hull or fruit-pulp.

B is the crank which operates the rollers. C is the feed-box into which the pease, cherries, or other fruit is placed.

D is the feed-board or grate. It should be somewhat inclined toward the rollers, so as to bring the fruit within their grasp.

In operating my invention, the fruit is first put into the feed-box C, the crank B being turned, and at the same time the pease or fruit is fed forward by the other hand. As the pease or fruit comes into the bite of the rollers the hulls or pulp is rolled forward between the rollers and is discharged into a suitable vessel, while the pease or the pits, which are unable to pass through, fall down through the grate-bar D into a suitable receptacle.

By my exceedingly cheap, simple, and effective machine I can hull pease or pit cherries with great speed.

Having thus fully described my invention, what I claim as new, and desire to secure by Letters Patent, is—

The two adjustable rollers A A, in combination with the feed-board D, constructed and operating in the manner and for the purposes specified.

In testimony that I claim the above I have hereunto set my hand this 6th day of July, 1865.

GELSTON SANFORD.

Witnesses:
J. T. SANFORD,
JAMES S. CUTTER.